United States Patent
Zhang et al.

(10) Patent No.: US 11,900,517 B2
(45) Date of Patent: *Feb. 13, 2024

(54) IMAGE MANIPULATION BY TEXT INSTRUCTION

(71) Applicant: Google LLC, Mountain View, CA (US)

(72) Inventors: Tianhao Zhang, Sunnyvale, CA (US); Weilong Yang, Freemont, CA (US); Honglak Lee, Ann Arbor, MI (US); Hung-Yu Tseng, Merced, CA (US); Irfan Aziz Essa, Atlanta, GA (US); Lu Jiang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,487

(22) Filed: Dec. 20, 2022

(65) Prior Publication Data

US 2023/0177754 A1 Jun. 8, 2023

Related U.S. Application Data

(63) Continuation of application No. 17/340,671, filed on Jun. 7, 2021, now Pat. No. 11,562,518.

(Continued)

(51) Int. Cl.
*G06T 11/60* (2006.01)
*G06T 9/00* (2006.01)
(Continued)

(52) U.S. Cl.
CPC .............. *G06T 11/60* (2013.01); *G06N 3/045* (2023.01); *G06N 3/088* (2013.01); *G06T 3/0006* (2013.01); *G06T 3/40* (2013.01); *G06T 9/002* (2013.01)

(58) Field of Classification Search
None
See application file for complete search history.

(56) References Cited

U.S. PATENT DOCUMENTS

2018/0268535 A1 9/2018 Shen et al.
2021/0174170 A1* 6/2021 Tu .......................... G06F 40/58
(Continued)

OTHER PUBLICATIONS

Ahmed et al, "Star-Caps: Capsule networks with straight-through attentive routing" NIPS, 2019, 10 pages.
(Continued)

*Primary Examiner* — Yanna Wu
(74) *Attorney, Agent, or Firm* — Fish & Richardson P.C.

(57) ABSTRACT

A method for generating an output image from an input image and an input text instruction that specifies a location and a modification of an edit applied to the input image using a neural network is described. The neural network includes an image encoder, an image decoder, and an instruction attention network. The method includes receiving the input image and the input text instruction; extracting, from the input image, an input image feature that represents features of the input image using the image encoder; generating a spatial feature and a modification feature from the input text instruction using the instruction attention network; generating an edited image feature from the input image feature, the spatial feature and the modification feature; and generating the output image from the edited image feature using the image decoder.

26 Claims, 4 Drawing Sheets

Related U.S. Application Data

(60) Provisional application No. 63/035,399, filed on Jun. 5, 2020.

(51) Int. Cl.
    *G06T 3/00*     (2006.01)
    *G06N 3/088*     (2023.01)
    *G06T 3/40*     (2006.01)
    *G06N 3/045*     (2023.01)

(56) References Cited

U.S. PATENT DOCUMENTS

2021/0334942 A1    10/2021    Wang et al.
2021/0341989 A1*   11/2021    Chen ........................ G06F 3/017

OTHER PUBLICATIONS

Arjovsky et al, "Wasserstein GAN" arXiv, 2017, 32 pages.
Brock et al, "Large scale gan training for high fidelity natural image synthesis" arXiv, 2019, 35 pages.
Chang et al, "Pairedcyclegan: Asymmetric style transfer for applying and removing makeup" CVPR, 2018, 9 pages.
Chen et al, "Image search with text feedback by visiolinguistic attention learning" CVPR, 2020, 11 pages.
Cordts et al, "The cityscapes dataset for semantic urban scene understanding" arXiv, 2016, 29 pages.
Devlin et al, "BERT: Pre-training of deep bidirectional transformers for language understanding" arXiv, 2018, 4 pages.
El-Nouby et al, "Tell, draw, and repeat: Generating and modifying images based on continual linguistic instruction" ICCV, 2019, 9 pages.
Ghosh et al, "Interactive sketch & fill: Multiclass sketch-to-image translation" ICCV, 2019, 10 pages.
Goodfellow et al, "Generative adversarial nets" NIPS, 2014, 9 pages.
Guo et al, "Dialog-based interactive image retrieval" NIPS, 2018, 11 pages.
He et al, "Deep residual learning for image recognition" CVPR, 2016, 9 pages.
Heusel et al, "GANs trained by a two time-scale update rule converge to a local nash equilibrium" arXiv, 2017, 38 pages.
Hong et al, "Learning hierarchical semantic image manipulation through structured representations" arXiv, 2018, 18 pages.
Huang et al, "Arbitrary style transfer in real-time with adaptive instance normalization" arXiv, 2017, 11 pages.
Huang et al, "Multimodal unsupervised image-to-image translation" ECCV, 2018, 18 pages.
Hung et al, "Learning to blend photos" ECCV, 2018, 17 pages.
Isola et al, "Image-to-image translation with conditional adversarial networks" arXiv, 2017. 17 pages.
Jang et al, "Categorical reparameterization with gumbel-softmax" arXiv, 2017, 13 pages.
Johnson et al, "Image generation from scene graphs" arXiv, 2018, 16 pages.
Johnson et al, "Inferring and executing programs for visual reasoning" arXiv, 2017, 13 pages.
Kim et al, "Multimodal Residual Learning for Visual QA" NIPS, 2016, 9 pages.
Kovashka et al, "Whittlesearch: Image search with relative attribute feedback" IEEE, 2012, 8 pages.
Lee et al, "Dancing to music" NIPS, 2019, 11 pages.
Lee et al, "Drit++: Diverse image-to-image translation via disentangled representations" IJCV, 2020, 16 pages.
Li et al, "A closed-form solution to photorealistic image stylization" arXiv, 2018, 23 pages.
Li et al, "Controllable and progressive image extrapolation" arXiv, 2019, 10 pages.
Li et al, "Controllable text-to-image generation" NIPS, 2019, 11 pages.
Li et al, "Diverse image synthesis from semantic layouts via conditional imle" ICCV, 2019, 10 pages.
Li et al, "Manigan: Text-guided image manipulation" arXiv, 2020, 16 pages.
Li et al, "Object-driven text-to-image synthesis via adversarial training" CVPR, 2019, 9 pages.
Liang et al, "Focal visual-text attention for memex question answering" IEEE, 2019, 15 pages.
Liu et al, "Darts: Differentiable architecture search" arXiv, 2019, 13 pages.
Ma et al, "Pose guided person image generation" arXiv, 2017, 20 pages.
Mao et al, "Least squares generative adversarial networks" arXiv, 2017, 16 pages.
Mao et al, "Program-guided image manipulators" arXiv, 2019, 19 pages.
Mejjati et al, "Unsupervised attention-guided image-to-image translation" arXiv, 2018, 22 pages.
Nam et al, "Text-adaptive generative adversarial networks: manipulating images with natural language" NIPS, 2018, 10 pages.
Newell et al, "Feature partitioning for efficient multi-task architectures" ICLR, 2020, 13 pages.
Noh et al, "Image question answering using convolutional neural network with dynamic parameter prediction" CVPR, 2016, 9 pages.
Owens et al, "Audio-visual scene analysis with self-supervised multisensory features" arXiv, 2018, 19 pages.
Park et al, "Semantic image synthesis with spatially-adaptive normalization" arXiv, 2019, 19 pages.
Perez et al, "Film: Visual reasoning with a general conditioning layer" AAAI, 2018, 10 pages.
Portenier et al, "Faceshop: Deep sketch-based face image editing" arXiv, 2018, 13 pages.
Rosenbaum et al, "Routing networks: Adaptive selection of non-linear functions for multi-task learning" ICLR, 2018, 16 pages.
Santoro et al, "A simple neural network module for relational reasoning" arXiv, 2017, 16 pages.
Ulyanov et al, "Improved texture networks: Maximizing quality and diversity in feed-forward stylization and texture synthesis" arXiv, 2017, 9 pages.
Vaswani et al, "Attention is all you need" arXiv, 2017, 15 pages.
Vo et al, "Composing text and image for image retrieval—an empirical odyssey" CVPR, 2019, 10 pages.
Wang et al, "High-resolution image synthesis and semantic manipulation with conditional gans" CVPR, 2018, 10 pages.
Xu et al, "AttnGAN: Fine-grained text to image generation with attentional generative adversarial networks" CVPR, 2018, 9 pages.
Yikang et al, "Pastegan: A semi-parametric method to generate image from scene graph" arXiv, 2019, 11 pages.
Zhang et al, "Colorful image colorization" arXiv, 2016, 29 pages.
Zhang et al, "Real-time user-guided image colorization with learned deep priors" arXiv, 2017, 11 pages.
Zhang et al, "Stackgan++: Realistic image synthesis with stacked generative adversarial networks" arXiv, 2018, 16 pages.
Zhao et al, "Memory-augmented attribute manipulation networks for interactive fashion search" CVPR, 2017, 9 pages.
Zhu et al, "Dm-gan: Dynamic memory generative adversarial networks for text-to-image synthesis" arXiv, 2019, 9 pages.
Zhu et al, "Toward multimodal image-to-image translation" arXiv, 2017, 12 pages.
Zhu et al, "Unpaired image-to-image translation using cycle-consistent adversarial network" ICCV, 2017, 10 pages.
Zitnick et al, "Bringing semantics into focus using visual abstraction" CVPR, 2013, 8 pages.

* cited by examiner

IMAGE MANIPULATION BY TEXT INSTRUCTION

CROSS REFERENCE TO RELATED APPLICATIONS

This application is a continuation of U.S. patent application Ser. No. 17/340,671 filed Jun. 7, 2021, which is non-provisional of and claims priority to U.S. Provisional Patent Application No. 63/035,399, filed on Jun. 5, 2020, the entire contents of which are hereby incorporated by reference.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates, using a neural network, an output image from an input image and an input text instruction that specifies a location and a modification of an edit applied to the input image.

Particular embodiments of the subject matter described in this specification can be implemented so as to realize one or more of the following advantages. The techniques described in this specification allow for a manipulation of a given reference image according to desired modifications described in an input text instruction. In particular, unlike traditional methods that merely focus on image synthesis from text where a Generative Adversarial Network (GAN) is learned to generate realistic images according to a text description, the described neural network model allows a user to apply various changes to a reference image to manipulate (e.g., to add, remove, or modify) its content by sending text instructions to a system that implements the neural network model. By treating language as neural operators to locally modify image features of the image and by decomposing the image generation process into finding where to edit (spatial region) and how to edit (text operators) the image, the described model can process a complex text instruction that involves not only adjectives (attributes) but also verbs (actions), nouns (objects), and adverbs (locations) for an effective conditional image manipulation. For the former "where to edit," the model learns an attention transforming spatial-indicative words to a spatial region in the image. For the latter "how to edit," the model uses an adaptive routing network to generate an execution path dynamically from the input instruction, in which text is modeled as neural operators specifying how to modify the image features. This design allows neural blocks in the neural network model to be shared among similar instructions, leading to a more effective image generation process that results in manipulation images that are not only realistic but also corresponds to the editing context described in the text instruction. Thus, the described neural network model can significantly outperforms state-of-the-art Conditional-GANs on different datasets with respect to various evaluation metrics.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that generates, using a neural network, an output image from an input image and an input text instruction that specifies a location and a modification of an edit applied to the input image.

Figure 1:
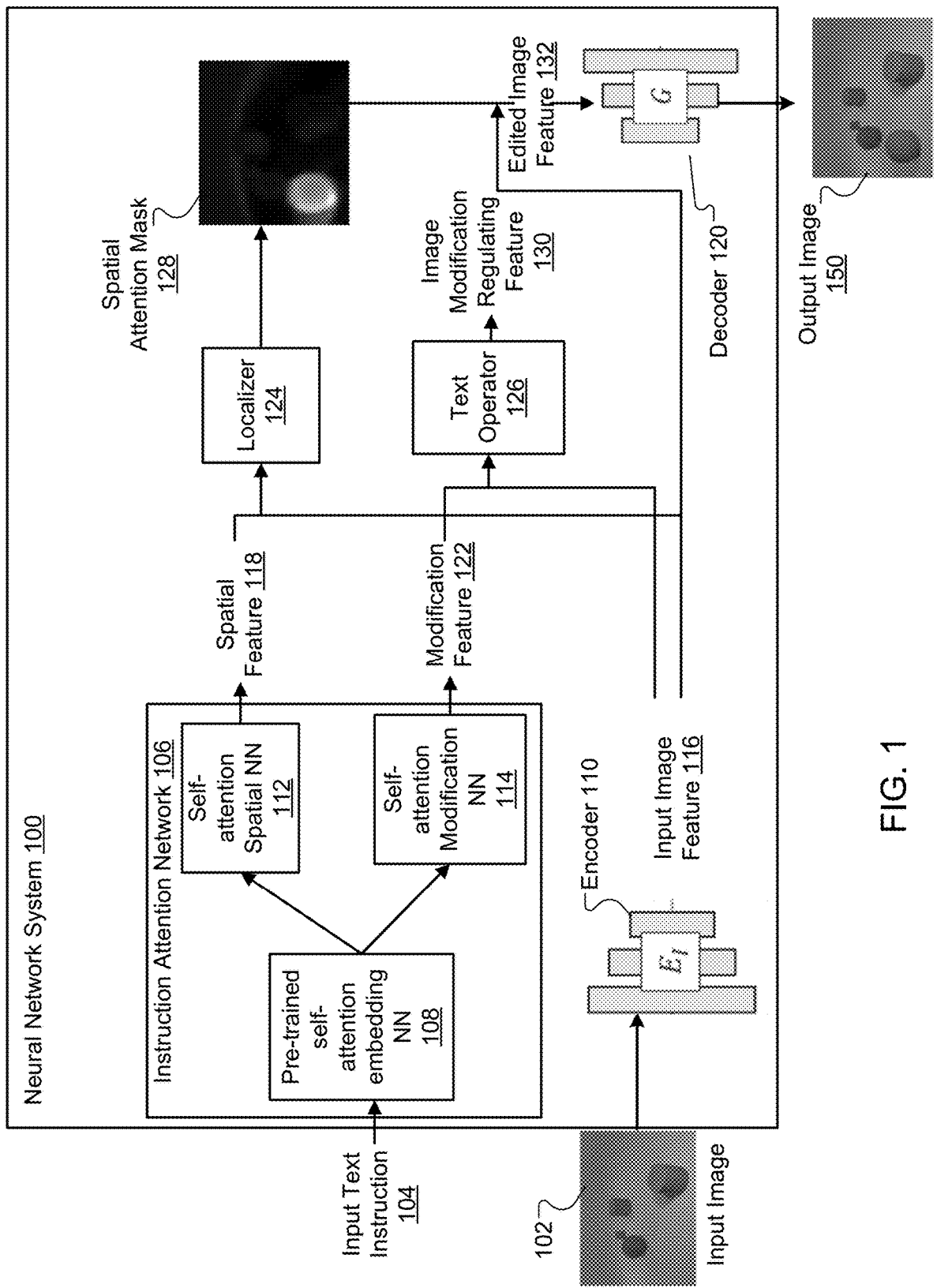
FIG. 1 shows an example neural network system for generating an output image from an input image and an input text instruction.

FIG. 1 shows an example neural network system 100 configured to receive as input an input image 102 and an input text instruction 104 and to generate an output image 150 based on the input image 102 and the input text instruction 104. The system 100 is an example of a system implemented as computer programs on one or more computers in one or more locations, in which the systems, components, and techniques described below can be implemented.

The input image 102 can be an image captured by, for example, a digital camera, a camera of a mobile device, or a camera of a robotic agent. The input text instruction 104 may include one or more words, in which each word is one of (i) a verb to describe an action, (ii) a noun to describe an object, (iii) an adjective to describe an attribute, or (iv) an adverb to describe a location. The modification of the input image 102 as directed by the input text instruction 104 may require one or more changes to one or more objects in the input image.

The output image 150 is an edited version of the input image 102 resulting from the modification of the input image 102 as directed by the input text instruction 104.

The input text instruction 104 may be received from a user computing device such as a desktop, a laptop or a mobile phone. In some cases, the instruction 104 can be received as speech and then converted into text (e.g., using automated speech recognition) and optionally translated into a fixed natural language (e.g., using neural machine translation).

In some cases, the instruction 104 may be received at a user device and transmitted to a remote system for image editing. In some other cases, the instruction 104 may be received at a user device and the image editing can be performed locally on the user device.

Figure 2A:
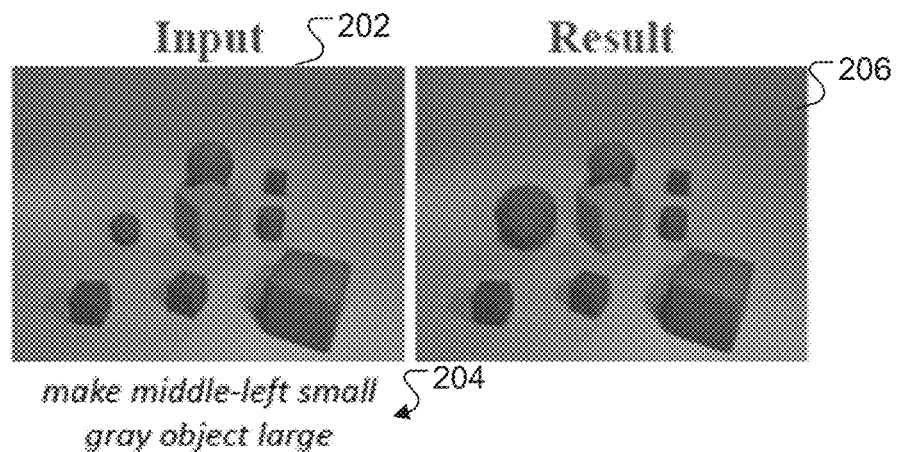
FIG. 2A, FIG. 2B, and FIG. 2C illustrate examples of an output image generated by the neural network system given an input image and an input text instruction.
Figure 2B:
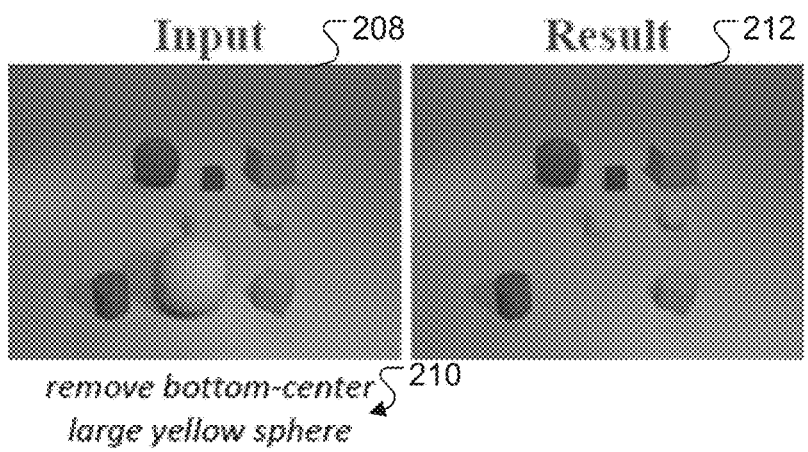
Figure 2C:
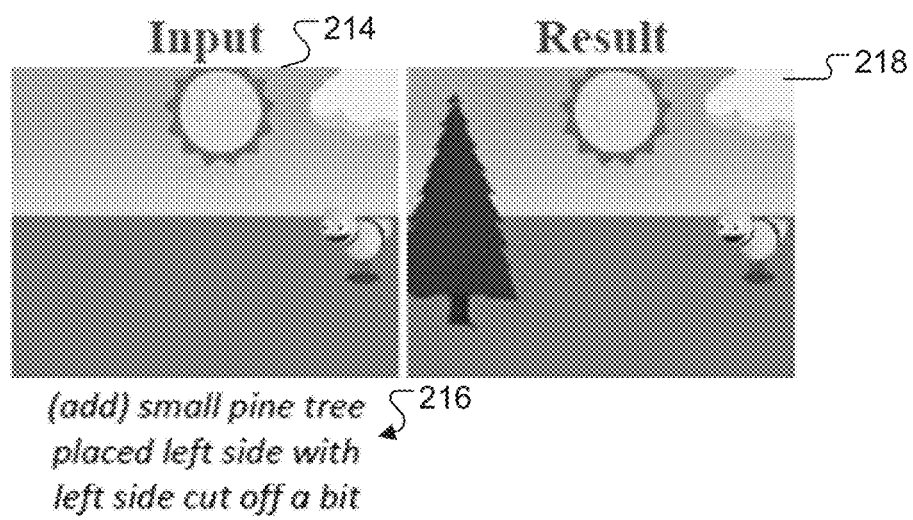

Each of FIG. 2A, FIG. 2B, and FIG. 2C shows an example of an output image generated by the neural network system 100 given an input image and an input text instruction. In FIG. 2A, the input image 202 shows multiple objects having different shapes, colors and sizes, and the input text instruction 204 is "make middle-left small gray object large." The output image 206 generated by the system 100 shows the same objects as shown in the input image 202, except that the middle-left small gray object is replaced with a larger object of the same color and shape, as directed by the input text instruction 204.

In FIG. 2B, the input image 208 shows multiple objects having different shapes, colors and sizes, and the input text instruction 210 is "remove bottom-center large yellow sphere." The output image 212 generated by the system 100 shows the same objects as shown in the input image 208 but without the bottom-center large yellow sphere, as directed by the input text instruction 210.

In FIG. 2C, the input image 214 shows a landscape picture having the sun, a cloud and a bird on a grass field, and the input text instruction 216 is "add small pine tree placed left side with left side cut off a bit." The output image 218 generated by the system 100 shows the same landscape picture as shown in the input image 214, and additionally, a small pine tree placed on the left side of the picture with the left side of the tree cut off a bit, as directed by the input text instruction 216.

Referring to FIG. 1, the neural network system 100 includes an image encoder 110, an image decoder 120, and an instruction attention network 106. Each of the image encoder and image decoder can be a convolutional neural network.

The image encoder 110 is configured to receive the input image and to extract, from the input image, an input image feature 116 that represents features of the input image 102.

The instruction attention network 106 is configured to process the input text instruction 104 to generate a spatial feature 118 and a modification feature 122. The spatial feature 118 encodes location information of the edit in the input image 102, and the modification feature 122 encodes modification information of the edit in the input image 102. In particular, the instruction attention network 106 includes (i) a pre-trained self-attention embedding neural network 108, (ii) a self-attention spatial network 112, and (iii) a self-attention modification network 114. The described architecture of the instruction attention network 106 is just one example architecture and any appropriate architecture can be used for the instruction attention network 106.

The pre-trained self-attention embedding neural network 108 is configured to generate, for each word in the input text instruction 104, a respective word embedding that is then fed as input into the self-attention spatial neural network 112 and the self-attention modification neural network 114. The pre-trained self-attention embedding neural network 108 may be, for example, a Bidirectional Encoder Representations from Transformers (BERT) neural network.

The self-attention spatial network 112 is configured to process the word embeddings generated by the neural network 108 to generate the spatial feature 118. The self-attention modification network 114 is configured to process the generated word embeddings to generate the modification feature 122.

For example, let $S=[w_1, \ldots, w_l] \in \mathbb{R}^{l \times d_0}$ denote the word embeddings of the input text instruction 104, where $w_i \in \mathbb{R}^{d_o}$ is the word embedding generated by the network 108 for the i-th word in the input text instruction 104. The self-attention spatial network 112 is configured to apply a scaled dot-product self-attention to S to summarize the location-indicative words in the input text instruction 104. The network 112 is configured to compute query, key and value in the attention by:

$$Q=SW_Q, K=SW_K, V=SW_V$$

where $W_Q, W_K, W_V \in \mathbb{R}^{d_0 \times d}$ are weight matrices, and d is an output dimension. After reducing matrix Q to a column vector q by average pooling along its first dimension, the network 112 generates the spatial feature 118, denoted as, by:

$$\phi_t^{where} = V^T \text{softmax}\left(\frac{K\hat{q}}{\sqrt{d}}\right),$$

in which the softmax function assigns higher attention weights for locational words.

Likewise, the system 100 processes the word embeddings S to generate the modification feature 122, denoted as $\phi_t^{how}$, for salient operational words in the instruction (e.g., "add", "red", "cylinder") using the self-attention modification network 114, which is a separate self-attention head similar to the self-attention spatial network 112.

The system 100 further includes a localizer network 124 and a text operator network 126. Example architectures of the localizer neural network 124 and the text operator network 126 are shown in FIG. 3A and FIG. 3B, respectively.

The localizer network 124 is configured to generate a spatial attention mask 128 from the spatial feature 118 and the input image feature 116. The spatial attention mask 128 specifies a desired region of the edit in the input image 102.

In particular, the localizer network 124 includes one or more convolutional neural network layers and a sigmoid localizer layer. The localizer network 124 is configured to process the spatial feature and the input image feature using the one or more convolutional neural network layers to generate a temporary localizer feature. The localizer network 124 is configured to process the temporary localizer feature using at least the sigmoid localizer layer to generate the spatial attention mask 128.

Figures 3A, 3B:
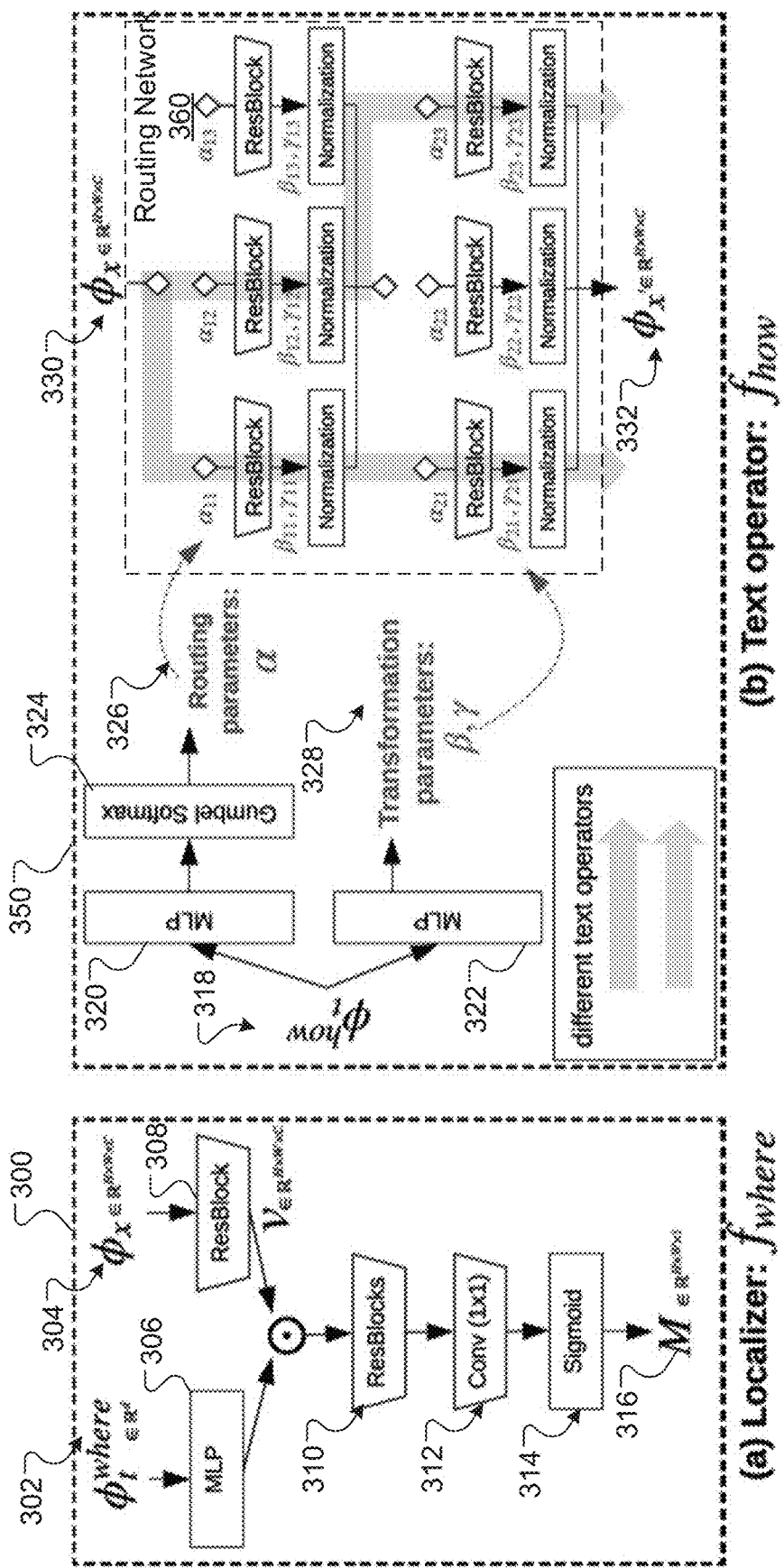
FIG. 3A shows an example architecture of a localizer network.
FIG. 3B shows an example architecture of a text operator network.

For example, FIG. 3A shows an example architecture of a localizer network 300. The localizer network 300 includes a convolutional neural network layer 308 (e.g., a ResBlock) that is configured to process the image feature $\phi_x$ to generate a temporary localizer feature $v \in \mathbb{R}^{H \times W \times C}$. The spatial mask M (316) is then computed from the spatial feature $\phi_t^{where}$ (302), using the temporary localizer feature v as context:

$$M=f_{where}(\phi_x, \phi_t^{where})=\delta(W_m * (f_{MLP}(\phi_t^{where}) \odot v)) \in [0,1]^{H \times W \times 1},$$

where $\odot$ is element-wise dot product, $f_{MLP}(.)$ is an operation applied by one or more multi-layer perceptron (MLP) layers 306 to the spatial feature $\phi_t^{where}$, $\delta$ is the sigmoid function applied by a sigmoid localizer layer 314, * represents the 2d-convolution product with kernel $W_m$, which can be applied by one or more convolutional neural network layers such as layers 310 and 312, and $f_{where}(.)$ represents the localizer network 300. The one or more MLP layers 306 may include two layers of MLP with a ReLU activation.

Referring to FIG. 1, the text operator network 126 is configured to generate an image modification regulating feature 130 from the modification feature 122 and the input image feature 116. The image modification regulating feature 130 regulates the modification of the input image 102 as directed by the input text instruction 104.

Because input text instructions are not independent, i.e., similar instructions perform similar operations, e.g., "add a large cylinder" and "add a red cylinder," the text operator network 126 is modelled to include a routing network where the text feature is used to dynamically select a sequence of neural blocks (or a path) in the routing network.

In particular, the text operator network 126 includes a routing network that includes one or more routing layers. Each routing layer may have one or more blocks. Each block may have a convolutional layer followed by a normalization layer.

The text operator network 126 has one or more text operator parameters. The one or more text operator parameters include a first set of parameters (referred to as "routing parameters") that defines an execution path for connecting the one or more blocks in each routing layer in the text operator network. The one or more text operator parameters includes a second set of parameters (referred to as "transformation parameters") that denotes scaling and bias parameters of affine transformations applied in one or more normalization layers of the text operator network 126.

The text operator network 126 includes one or more feed-forward neural network layers (e.g., one or more MLP layers) configured to receive the modification feature 122 and to generate the one or more text operator parameters.

The text operator network 126 generates the image modification regulating feature 130 by passing the input image feature 116 through the routing network with the generated one or more routing parameters. In other words, the text operator network 126 processes the input image feature 116 using the routing network in accordance with the generated one or more text operator parameters to generate the image modification regulating feature 130.

For example, FIG. 3B shows an example architecture of a text operator network 350 that includes a routing network 360. The routing network 360 has l layers of m blocks of identical structures. Each block includes of a convolutional neural network layer followed by an instance normalization layer. The routing parameter $\alpha_i$ decides to connect or disconnect a block in a layer i. An execution path is hence parameterized by a series of a for all layers. The text operator parameters, denoted as $\oplus_{how}(t)$, can be defined by:

$$\Theta_{how}(t) = f_{MLP}(\phi_t^{how}) = \{(\alpha_i, \beta_i, \gamma_i) | \alpha_i \in [0,1]^m, \gamma_i, \beta_i \in \mathbb{R}^{m \times p}, i \in \{1, \ldots, l\}\},$$

where $f_{MLP}(.)$ denotes one or more feed-forward neural network layers (e.g., the MLP layer 320 and MLP layer 322 in FIG. 3B) configured to process the modification feature $\phi_t^{how}$ to generate the routing parameter $\alpha_i$ and transformation parameter $\beta_i$, $\gamma_i$ for text-adaptive routing for each layer i, p is the number of normalization parameters for each block. In some implementations, the text operator network 350 includes a softmax layer 324 that is configured to process the output of the MLP layer 320 to generate the routing parameters $\alpha$.

The text operator network 350 processes the input image feature $\phi_x$ (330) using the routing network 360 in accordance with the generated one or more text operator parameters to generate the image modification regulating feature $\phi'_x$ (332). For example, the input image feature 330 is modified by:

$$a^{(i+1)} = \sum_{j=1}^{m} \alpha_{ij} \left( \gamma_{ij} \frac{o_{ij} - \mu(o_{ij})}{\delta(o_{ij})} + \beta_{ij} \right), \quad (*)$$

where $o_{ij}$ is the output of the j-th block (e.g., a convolutional block) in layer i. $\delta$ and $\mu$ compute channel-wise mean and variance across spatial dimensions. The operator in Equation (*) takes the input of $a^{(1)} = \phi_x$ and outputs the image modification regulating feature as a).

Different from prior routing mechanisms, the text operator network described in this specification is text-adaptive which selects not only a path but also the associated parameters along the path. In addition to routing parameters $\alpha$, text features also generate transformation parameters $\beta$, $\gamma$ to perform text-specific normalization in the selected block. This design increases the learning capacity of the text operator network, while still allowing blocks to be shared among similar text instructions, thus increasing accuracy while reducing computational costs for processing similar text instructions.

Referring to FIG. 1, after the spatial attention mask 128 and the image modification regulating feature 130 are generated, the system 100 processes the input image feature 116, the spatial attention mask 128, and the image modification regulating feature 130 to generate an edited image feature 132.

In particular, the system 100 computes a first dot product of the complement of the spatial attention mask 128 and the input image feature 116: $(1-M) \odot \phi_x$.

The system 100 computes a second dot product of the spatial attention mask and the image modification regulating feature: $M \odot f_{how}(\phi x; \phi_t^{how}; \oplus_{how}(t))$. The system 100 computes a sum of the first dot product and the second dot product and returns the sum as the edited image feature $\phi_{\hat{y}}$ (132):

$$\phi_{\hat{y}} = (1-M) \odot \phi_x + M \odot f_{how}(\phi_x, \phi_t^{how}; \oplus_{how}(t))$$

The image decoder 120 is configured to receive the edited image feature 132 and to process the edited image feature 132 to generate the output image 150.

Figure 4:
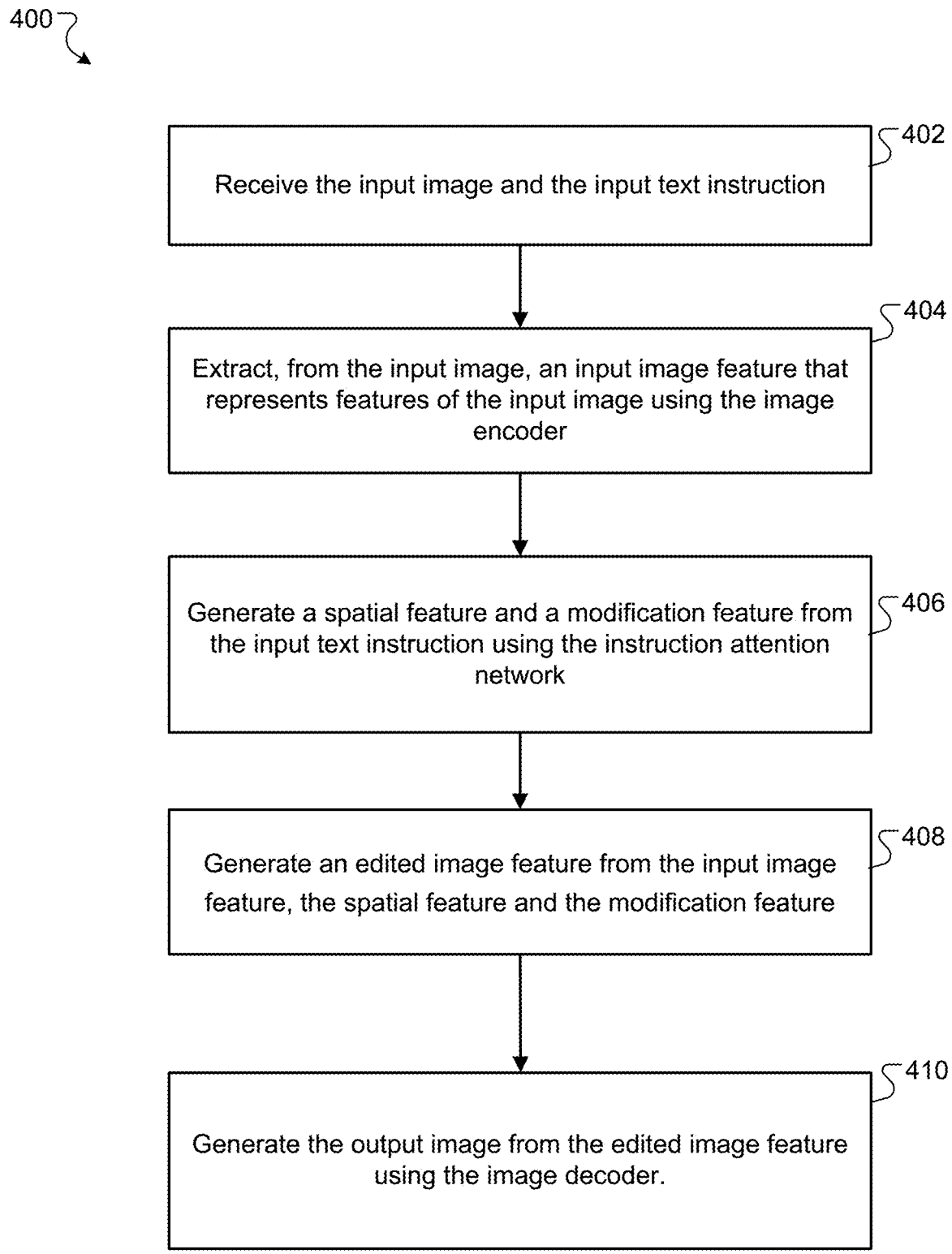
FIG. 4 is a flow diagram of an example process for generating an output image from an input image and an input text instruction.

FIG. 4 is a flow diagram of an example process 400 for generating an output image from an input image and an input text instruction using a neural network. The input text instruction specifies a location and a modification of an edit applied to the input image. The modification of the input image requires one or more changes to one or more objects in the input image.

For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system receives the input image and the input text instruction (step 402). the input text instruction comprises one or more words, wherein each of the one or more words is one of (i) a verb to describe an action, (ii) a noun to describe an object, (iii) an adjective to describe an attribute, or (iv) an adverb to describe a location.

The system extracts, from the input image, an input image feature that represents features of the input image using an image encoder of the neural network (step 404). The image encoder may be a convolutional neural network.

The system generates a spatial feature and a modification feature from the input text instruction using an instruction attention network of the neural network (step 406). The spatial feature encodes location information of the edit in the input image, and the modification feature encodes modification information of the edit in the input image. The instruction attention network includes (i) a pre-trained self-attention embedding neural network, (ii) a self-attention spatial network, and (iii) a self-attention modification network.

In particular, the system generates, for each word in the input text instruction, a respective word embedding using the pre-trained self-attention embedding neural network.

The system generates the spatial feature from the generated word embeddings using the self-attention spatial network. The system generates the modification feature from the generated word embedding using the self-attention modification network.

The system generates an edited image feature from the input image feature, the spatial feature and the modification feature (step 408).

In particular, the system generates a spatial attention mask from the spatial feature and the input image feature using a localizer network of the neural network. The spatial attention mask specifies a desired region of the edit in the input image. The localizer network may include one or more convolutional neural network layers and a sigmoid localizer layer.

To generate the spatial attention mask, the system generates a temporary localizer feature by processing the spatial feature and the input image feature using the one or more convolutional neural network layers. The system generates the spatial attention mask by processing the temporary localizer feature using the sigmoid localizer layer.

The system generates an image modification regulating feature from the modification feature and the input image feature using a text operator network of the neural network. The image modification regulating feature regulates the modification of the input image as directed by the input text instruction.

The text operator network includes a routing network that includes one or more routing layers with one or more text operator parameters, each routing layer having one or more blocks, and each block having a convolutional layer followed by a normalization layer.

The text operator network may include one or more feed-forward neural network layers configured to receive the modification feature and generate the one or more routing parameters.

In particular, to generate the image modification regulating feature, the system generates the one or more text operator parameters from the modification feature using the one or more feed-forward neural network layers. The system generates the image modification regulating feature by passing the input image feature through the routing network with the generated one or more routing parameters.

The system then generates the edited image feature from the input image feature, the spatial attention mask, and the image modification regulating feature.

In particular, the system computes a first dot product of the complement of the spatial attention mask and the input image feature. The system computes a second dot product of the spatial attention mask and the image modification regulating feature. The system computes a sum of the first dot product and the second dot product and returns the sum as the edited image feature.

The system generates the output image from the edited image feature using the image decoder (step 410). The image decoder may be a convolutional neural network.

The neural network described herein has a plurality of network parameters that can be determined through training the neural network to optimize a loss function. The loss function can be a combination of one or more sub-loss functions. For example, wherein the loss function is a weighted sum of the one or more sub-loss functions.

In some implementations, the one or more sub-loss functions may include an adversarial loss that ensures the realism of output images. For example, the adversarial loss can take the following form:

$$\mathcal{L}_{GAN} = E_{y \sim P_{data}}[\log D(y)] + E_{\hat{y} \sim P_{model}}[1 - \log D(\hat{y})],$$

where D denotes the discriminator.

In some implementations, the one or more sub-loss functions include an image regression loss that ensures the consistency of the output image and a respective ground-truth output image.

In some implementations, the one or more sub-loss functions include one or more image feature regression losses that ensure the consistency of the edited image feature and a respective ground-truth edited image feature.

For example, the one or more regression losses include regression losses $L_1^{feat}$ and $L_1^{img}$. Given the ground-truth output image y and its feature $\phi_y$, the regression losses are imposed on the edited image feature $\phi_{\hat{y}}$ and the generated output image $\hat{y}$, respectively. The $L_1$ loss is applied to ensure the consistency on both feature and image levels.

In some implementations, the one or more sub-loss functions include an attention loss (which can be denoted as, for example, $L_1^{attn}$) to penalize a distance between the spatial attention mask and a respective ground-truth spatial attention mask, in which the respective ground-truth spatial attention mask is derived by comparing the absolute difference between the input image and a ground-truth output image.

In some implementations, the one or more sub-loss functions may include a path divergence loss that ensures the diversity of path executions in the text operator network.

An example of the loss function is as follows:

$$\mathcal{L} = \lambda_{GAN} \mathcal{L}_{GAN} + \lambda_1^{feat} \mathcal{L}_1^{feat} + \lambda_1^{img} \mathcal{L}_1^{img} + \lambda_1^{attn} \mathcal{L}_1^{attn},$$

where λ controls the importance of each term.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating an output image from an input image and an input text instruction that specifies a location and a modification of an edit applied to the input image using a neural network that comprises an image encoder, an image decoder, and an instruction attention network:
   receiving the input image and the input text instruction;
   extracting, from the input image, an input image feature that represents features of the input image using the image encoder;
   generating a spatial feature and a modification feature from the input text instruction using the instruction attention network, wherein the spatial feature encodes location information of the edit in the input image, and the modification feature encodes modification information of the edit in the input image;
   generating an edited image feature from (i) the input image feature extracted from the input image, (ii) the spatial feature generated by using the spatial neural network, and (iii) the modification feature generated by using the modification neural network, comprising:
      generating a spatial attention mask from the spatial feature and the input image feature, wherein the spatial attention mask specifies a desired region of the edit in the input image,
      generating an image modification regulating feature from the modification feature and the input image feature, wherein the image modification regulating feature regulates the modification of the input image as directed by the input text instruction, and
      generating the edited image feature from the input image feature, the spatial attention mask, and the image modification regulating feature; and
   generating the output image from the edited image feature using the image decoder.

2. The method of claim 1, wherein the input text instruction comprises one or more words, wherein each of the one or more words is one of (i) a verb to describe an action, (ii) a noun to describe an object, (iii) an adjective to describe an attribute, or (iv) an adverb to describe a location.

3. The method of claim 1, wherein the modification information of the edit in the input image requires one or more changes to one or more objects in the input image.

4. The method of claim 1, wherein the image encoder is a convolutional neural network.

5. The method of claim 1, wherein the image decoder is a convolutional neural network.

6. The method of claim 1, wherein the embedding neural network is a pre-trained self-attention embedding neural network, the spatial neural network is a self-attention spatial neural network, and the modification neural network is a self-attention modification neural network.

7. The method of claim 6, wherein generating the one or more word embeddings of the input text instruction using the embedding neural network comprise generating, for the one or more words in the input text instruction, the one or more word embeddings using the pre-trained self-attention embedding neural network;
   generating the spatial feature from the one or more generated word embeddings using the spatial neural network comprises: generating the spatial feature from the one or more generated word embeddings using the self-attention spatial neural network; and
   generating the modification feature from the one or more generated word embeddings using the modification neural network comprises: generating the modification feature from the one or more generated word embeddings using the self-attention modification neural network.

8. The method of claim 1, wherein the neural network further comprises a localizer network and a text operator network.

9. The method of claim 8, wherein the localizer network comprises one or more convolutional neural network layers and a sigmoid localizer layer.

10. The method of claim 8, wherein generating the edited image feature from the input image feature, the spatial feature and the modification feature comprises:
   generating a spatial attention mask from the spatial feature and the input image feature using the localizer network, wherein the spatial attention mask specifies a desired region of the edit in the input image,
   generating an image modification regulating feature from the modification feature and the input image feature using the text operator network, wherein the image modification regulating feature regulates the modification of the input image as directed by the input text instruction, and
   generating the edited image feature from the input image feature, the spatial attention mask, and the image modification regulating feature.

11. The method of claim 10, wherein generating the spatial attention mask from the spatial feature and the input image feature using the localizer network includes:

generating a temporary localizer feature by processing the spatial feature and the input image feature using the one or more convolutional neural network layers; and generating the spatial attention mask by processing the temporary localizer feature using the sigmoid localizer layer.

12. The method of claim 10, wherein the text operator network comprises a routing network, wherein the routing network comprises one or more routing layers with one or more text operator parameters, each routing layer having one or more blocks, and each block having a convolutional layer followed by a normalization layer.

13. The method of claim 12, wherein the text operator network further comprises one or more feed-forward neural network layers configured to receive the modification feature and generate the one or more routing parameters.

14. The method of claim 13, wherein the one or more text operator parameters comprises a first set of parameters that defines an execution path for connecting the one or more blocks in each routing layer in the text operator network.

15. The method of claim 13, wherein the one or more text operator parameters comprises a second set of parameters denoting scaling and bias parameters of affine transformations applied in one or more normalization layers of the text operator network.

16. The method of claim 13, wherein generating the image modification regulating feature from the modification feature and the input image feature using the text operator network comprises:

generating the one or more text operator parameters from the modification feature using the one or more feed-forward neural network layers, and generating the image modification regulating feature by passing the input image feature through the routing network with the generated one or more routing parameters.

17. The method of claim 1, wherein generating the edited image feature from the input image feature, the spatial attention mask, and the image modification regulating feature includes:

computing a first dot product of the complement of the spatial attention mask and the input image feature;

computing a second dot product of the spatial attention mask and the image modification regulating feature;

computing a sum of the first dot product and the second dot product; and returning the sum as the edited image feature.

18. The method of claim 1, wherein the neural network has a plurality of network parameters that are determined by optimizing a loss function, and wherein the loss function is a combination of one or more sub-loss functions.

19. The method of claim 18, wherein the loss function is a weighted sum of the one or more sub-loss functions.

20. The method of claim 18, wherein the one or more sub-loss functions comprise an adversarial loss that ensures the realism of the output image.

21. The method of claim 18, wherein the one or more sub-loss functions comprise an image regression loss that ensures the consistency of the output image and a respective ground-truth output image.

22. The method of claim 18, wherein the one or more sub-loss functions comprise an image feature regression loss that ensures the consistency of the edited image feature and a respective ground-truth edited image feature.

23. The method of claim 18, wherein the one or more sub-loss functions comprise an attention loss to penalize a distance between the spatial attention mask and a respective ground-truth spatial attention mask, wherein the respective ground-truth spatial attention mask is the absolute difference between the input image and a ground-truth output image.

24. The method of claim 18, wherein the one or more sub-loss functions comprise a path divergence loss that ensures the diversity of path executions in the text operator network.

25. A system comprising one or more computers and one or more storages devices storing instructions that, when executed by the one or more computers, cause the one or more computers to perform operations for generating an output image from an input image and an input text instruction that specifies a location and a modification of an edit applied to the input image using a neural network that comprises an image encoder, an image decoder, and an instruction attention network, wherein the instruction attention network comprises an embedding neural network, a spatial neural network and a modification neural network, the operations comprising:

receiving the input image and the input text instruction;

extracting, from the input image, an input image feature that represents features of the input image using the image encoder;

generating a spatial feature and a modification feature from the input text instruction using the instruction attention network, wherein the spatial feature encodes location information of the edit in the input image, and the modification feature encodes modification information of the edit in the input image;

generating an edited image feature from (i) the input image feature extracted from the input image, (ii) the spatial feature generated by using the spatial neural network, and (iii) the modification feature generated by using the modification neural network, comprising:

generating a spatial attention mask from the spatial feature and the input image feature, wherein the spatial attention mask specifies a desired region of the edit in the input image, generating an image modification regulating feature from the modification feature and the input image feature, wherein the image modification regulating feature regulates the modification of the input image as directed by the input text instruction, and generating the edited image feature from the input image feature, the spatial attention mask, and the image modification regulating feature; and generating the output image from the edited image feature using the image decoder.

26. One or more non-transitory computer storage media storing instructions that, when executed by one or more computers, cause the one or more computers to perform operations for generating an output image from an input image and an input text instruction that specifies a location and a modification of an edit applied to the input image using a neural network that comprises an image encoder, an image decoder, and an instruction attention network, wherein the instruction attention network comprises an embedding neural network, a spatial neural network and a modification neural network, the operations comprising:

receiving the input image and the input text instruction;

extracting, from the input image, an input image feature that represents features of the input image using the image encoder;

generating a spatial feature and a modification feature from the input text instruction using the instruction attention network, wherein the spatial feature encodes location information of the edit in the input image, and the modification feature encodes modification information of the edit in the input image;

generating an edited image feature from (i) the input image feature extracted from the input image, (ii) the spatial feature generated by using the spatial neural network, and (iii) the modification feature generated by using the modification neural network, comprising:

generating a spatial attention mask from the spatial feature and the input image feature, wherein the spatial attention mask specifies a desired region of the edit in the input image, generating an image modification regulating feature from the modification feature and the input image feature, wherein the image modification regulating feature regulates the modification of the input image as directed by the input text instruction, and generating the edited image feature from the input image feature, the spatial attention mask, and the image modification regulating feature; and generating the output image from the edited image feature using the image decoder.

\* \* \* \* \*